United States Patent [19]
Matano et al.

[11] Patent Number: 5,354,094
[45] Date of Patent: Oct. 11, 1994

[54] AIR-BAG ARRANGEMENT

[75] Inventors: Minoru Matano; Akio Oikawa, both of Kanagawa, Japan

[73] Assignee: Nissan Motor Co., Ltd., Yokohama, Japan

[21] Appl. No.: 799,826

[22] Filed: Nov. 27, 1991

[30] Foreign Application Priority Data

Nov. 27, 1990 [JP] Japan ................................ 2-320932

[51] Int. Cl.⁵ ............................................ B60R 21/20
[52] U.S. Cl. ................................................ 280/728 B
[58] Field of Search ............ 280/743, 728, 732, 728 B, 280/728 A, 731, 728 R; 403/381

[56] References Cited
U.S. PATENT DOCUMENTS

| | | | |
|---|---|---|---|
| 509,364 | 11/1893 | Coffeen, Jr. | 403/381 |
| 2,538,654 | 1/1951 | Petersen | 403/381 |
| 3,539,200 | 11/1970 | Chute | 280/731 |
| 4,770,439 | 9/1988 | Maier et al. | 280/732 |
| 4,941,678 | 7/1990 | Lauritzen et al. | 280/743 |
| 5,060,972 | 10/1991 | Satoh | 280/728 B |
| 5,066,037 | 11/1991 | Castrigno | 280/743 |

FOREIGN PATENT DOCUMENTS

| | | | |
|---|---|---|---|
| 1948615 | 4/1971 | Fed. Rep. of Germany | 280/731 |
| 3545028 | 7/1987 | Fed. Rep. of Germany | 280/728 B |
| 1-81154(U) | 5/1989 | Japan | 280/728 B |
| 0227753 | 10/1991 | Japan | 280/743 |
| 4-046841 | 2/1992 | Japan | 280/743 |
| 2246983 | 2/1992 | United Kingdom | 280/728 |

*Primary Examiner*—Karin L. Tyson
*Attorney, Agent, or Firm*—Foley & Lardner

[57] ABSTRACT

An air-bag arrangement includes an air-bag module disposed in a recess of an instrument panel, and a lid member for covering an opening of the recess. The lid member is secured to the instrument panel. The lid member is openable in response to inflation of an air bag of the air-bag module to accommodate expansion of the air bag into the passenger space. A first bracket member is secured to the lid member. A second bracket member is secured to the instrument panel and arranged to be brought into engagement with the first bracket member in a manner wherein distortion of either of the first and second bracket members is absent and to allow the first bracket member to be detached from the second bracket member in a snap action manner upon inflation of the air bag.

16 Claims, 3 Drawing Sheets

AIR-BAG ARRANGEMENT

BACKGROUND OF THE INVENTION

1. Field of the Invention

The present invention relates in general to an air-bag arrangement, and more particularly to a structure for fixing a lid member of an air-bag device on an instrument panel, which air-bag device provides a protective cushioning effect for a front passenger of a vehicle in the event of a vehicle collision.

2. Description of the Prior Art

In order to clarify the task of the present invention, one conventional structure for fixing a lid member of an air-bag device on an instrument panel will be outlined, prior to making a detailed description of the present invention, which is shown in U.S. Pat. No. 4,770,439.

In the structure shown by the publication, an instrument panel has a recess on the front passenger side. An air-bag module is disposed in the recess which is closed by a lid member. In assembly, the lid member is brought into engagement at its cylindrical holding part with a spring buckle of a receiving frame in a snap action manner. Then, the receiving frame together with the lid member is pushed into a support part of the instrument panel. With this, the lid member is disposed in a predetermined position relative to the instrument panel so as to close the recess. When an air-bag is inflated and presses against the lid member, the cylindrical holding part of the lid member is detached from the spring buckle of the receiving frame in a snap action manner so as to open up the lid member.

However, the above-mentioned structure has following drawbacks.

First, since the lid member is brought into engagement with the receiving frame in a snap action manner, grip or resilience of the spring buckle which directly effects the snap action characteristics of the same, tends to deviate slightly from the value nominated by design specifications. Therefore, measures should be taken to maintain resilience of the spring buckle at the nominated value.

Secondly, since the lid member is not directly fixed on the instrument panel, the lid member tends to be displaced from a predetermined position relative to the instrument panel. With this, the lid member does not match the instrument panel, thereby deteriorating the external appearance of the instrument panel and the lid member.

SUMMARY OF THE INVENTION

It is therefore a general object of the present invention to provide a structure for fixing a lid member of an air-bag device on an instrument panel, which structure enables an air bag to be inflated in a precisely controlled manner.

It is a more specific object of the present invention to provide a lid member of an air-bag device which is opened in a precisely controlled manner when the air bag is inflated.

It is another object of the present invention to provide a lid member which is directly fixed on an instrument panel.

According to a first aspect of the present invention, there is provided, in a motor vehicle having a passenger space and an instrument panel, an air-bag arrangement comprising: means for defining a recess in the instrument panel, the recess having an opening; an air-bag module disposed in the recess, the air-bag module including an air bag; a lid member for covering the opening of the recess, the lid member being secured to the instrument panel, the lid member being openable in response to inflation of the air bag to accommodate expansion of the air bag into the passenger space; a first bracket member secured to the lid member; a second bracket member arranged to be brought into engagement with the first bracket member in a manner wherein distortion of either of the first and second bracket members is absent and to allow the first bracket member to be detached from the second bracket member in a snap action manner upon inflation of the air bag; and means for securing the second bracket member to the instrument panel.

According to a second aspect of the present invention, there is provided a method for arranging an air-bag device in a motor vehicle having a passenger space and an instrument panel, the panel having a recess for receiving therein an air-bag module having an air bag, the recess having an opening, the method comprising the steps of: (a) securing a lid member to the instrument panel so as to cover the opening and as to be openable in response to inflation of the air bag to accommodate expansion of the air bag into the passenger space, the lid member having a first bracket member secured thereto; (b) before or after step (a), engaging a second bracket member with the first bracket member in a manner wherein distortion of either of the first and second bracket members is absent; and (c) securing the second bracket member to the instrument panel so as to allow the first bracket member to be detached from the second bracket member in a snap action manner upon inflation of the air bag.

DESCRIPTION OF THE PREFERRED EMBODIMENT

Referring to FIGS. 1 to 5, there is shown a structure for fixing a lid member of an air-bag device to an instrument panel, which is a first embodiment of the present invention.

Figure 1:
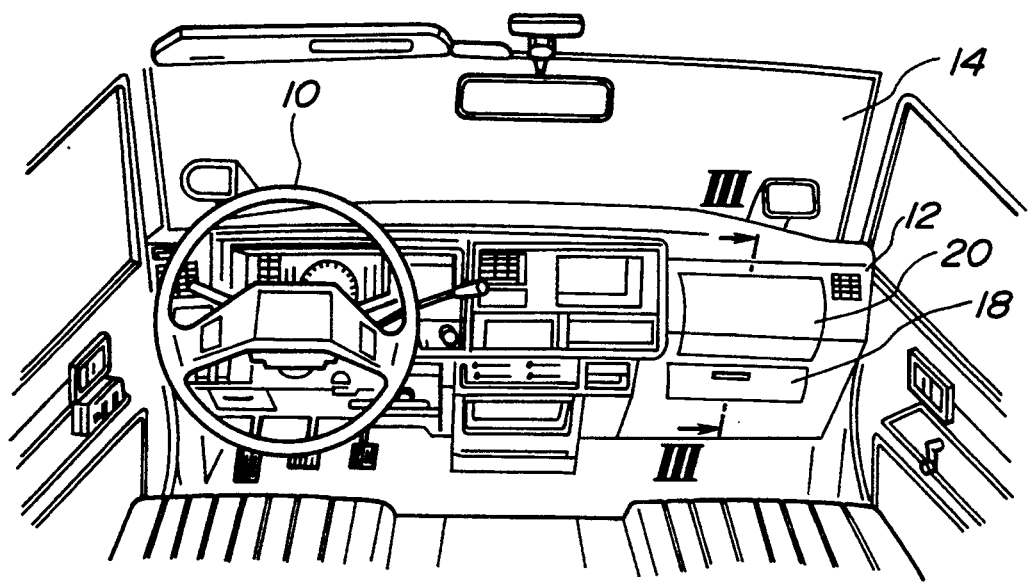
FIG. 1 is a perspective view, showing an instrument panel of a vehicle, on which instrument panel a lid member of an air-bag device is fixed in accordance with a first embodiment of the present invention.

As is seen from FIG. 1, there is provided a left-hand drive motor vehicle which has a steering wheel 10 on the left side. The motor vehicle is equipped with an air-bag device for preventing a front passenger on the right side from hitting directly against an instrument panel 12 and/or a front windshield 14 upon experiencing a deceleration at during a vehicle collision, over a predetermined level. The instrument panel 12 has a recess 16 on the front passenger side, above a glove box 18, for receiving therein the air-bag device which is concealed with a lid member 20.

Figure 3:
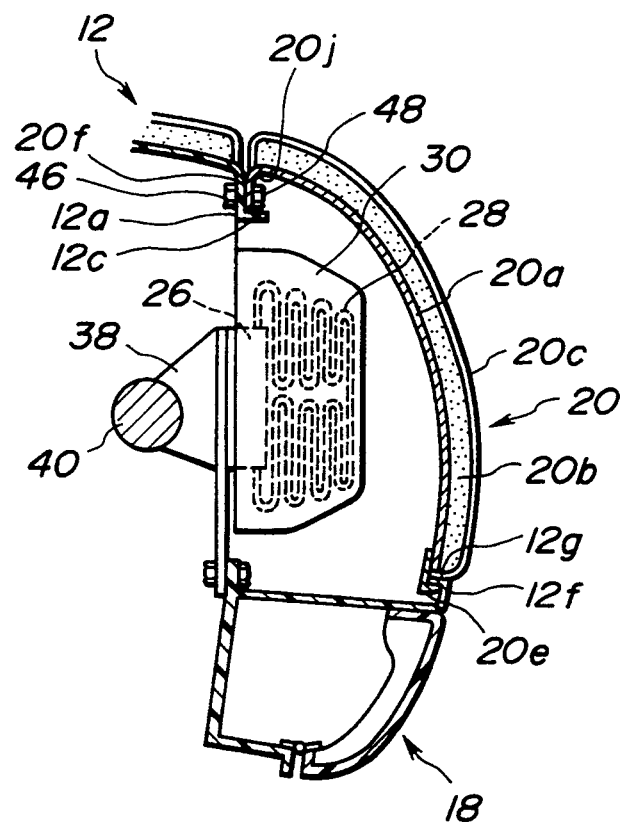
FIG. 3 is a sectional view which is taken along the line III—III of FIG. 1.
Figure 2:
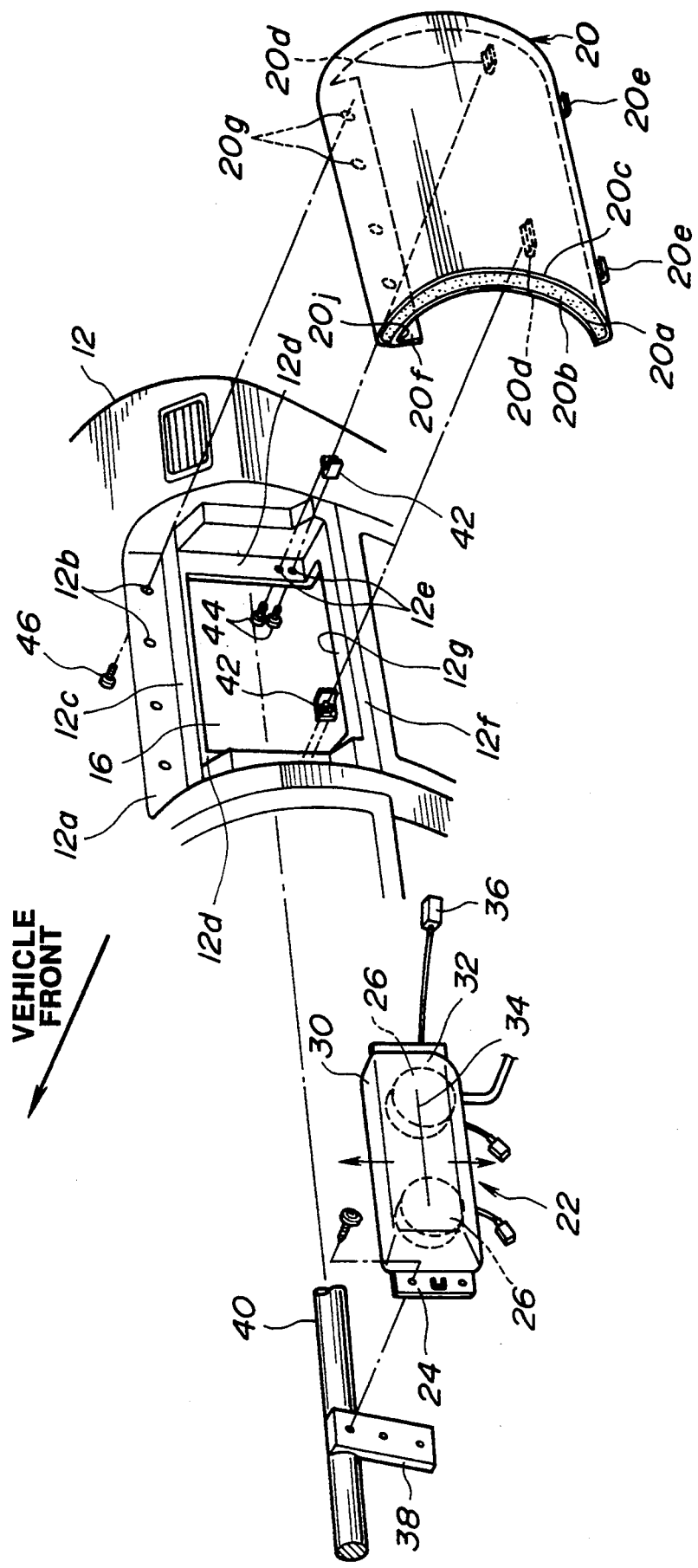
FIG. 2 is an enlarged and exploded perspective view, showing a part of the instrument panel and the air-bag device, according to the first embodiment of the present invention.

As is seen from FIG. 2, an air-bag module 22 comprises a base plate 24, two gas generators 26 which are fixed on the base plate 24, an air bag 28 secured at its mouth portion to the gas generators 26 such that the gas generators 26 are exposed to the interior of the air bag 28, and a module cover 30 covering the gas generators 26 and the air bag 28 which is in a deflated and folded condition (see FIG. 3).

The module cover 30 is formed at its major vertical surface 32 with a groove 34 for allowing the module cover 30 to be broken when the air bag 28 is inflated and presses against the module cover 30. The gas generators 26 are electrically connected to a collision sensor 36 located in a certain position in the vehicle. The air-bag module 22 is secured at its base plate 24 to bracket members 38 (only one is shown) of an elongate reinforcing member 40 which extends transversely and is secured to a vehicle body. Each gas generator 26 has an initiator (not shown) and propellant pellets (not shown) therein for generating gas upon receiving a signal from the collision sensor 36.

The instrument panel 12 has an upper vertical flange 12a having a plurality of bolt holes 12b formed therethrough and having a horizontal supporting portion 12c, side vertical flanges 12d having bolt holes 12e formed therethrough, and a lower vertical flange 12f having a horizontal portion 12g.

The lid member 20 of the air-bag device comprises a base plate 20a, a pad member 20b, and an outer skin member 20c for covering the pad member 20b. The base plate 20a is made of aluminum, iron or the like. The pad member 20b is made of a resilient foamed material, or the like. The base plate 20a is formed at its lower portion with two spaced first bracket members 20d extending toward the instrument panel 12. Each first bracket member 20d is made of plastic. Two flexible hooks 20e are secured to a lower end of the base plate 20a.

As is seen from FIG. 3, the base plate 20a is formed at its upper end with a vertical flange 20f having a plurality of bolt holes 20g formed therethrough.

Figures 5, 6:
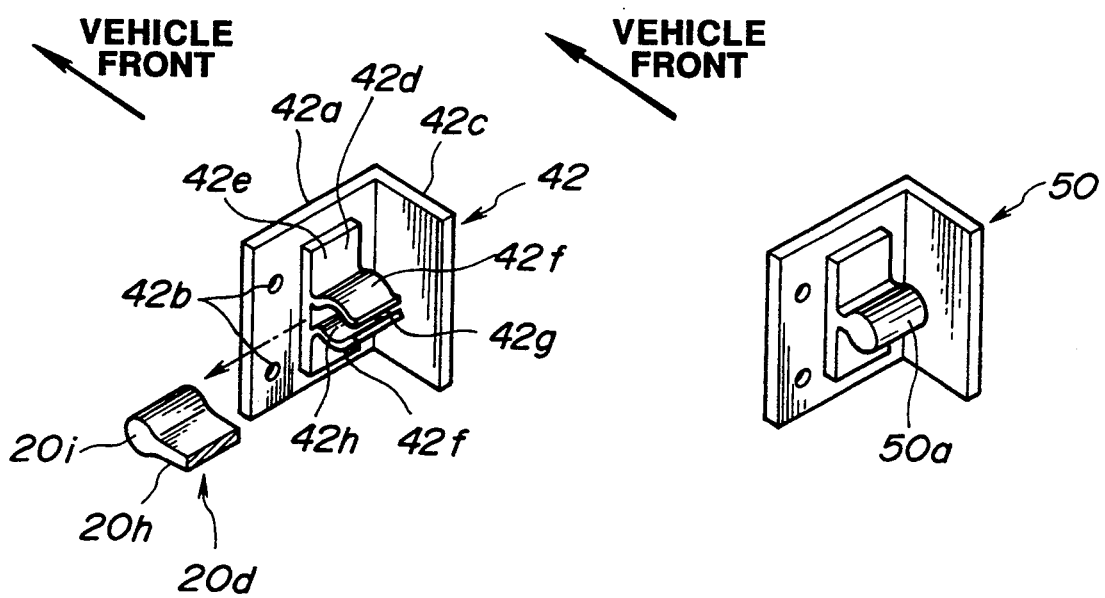
FIG. 5 is an enlarged perspective view of a first bracket member and a second bracket member in accordance with the first embodiment, showing a direction with an arrow, in which the second bracket member is brought into engagement with the first bracket member.
FIG. 6 is a view similar to FIG. 5, but showing a third bracket member to be engaged with a fourth bracket member in accordance with a second embodiment.

As is seen from FIG. 5, each first bracket member 20d comprises a rectangular base portion 20h and a cylindrical projection 20i.

Two second bracket members 42 which are made of plastic are secured to the side vertical flanges 12d through bolts 44 and nuts (not shown). Each second bracket member 42 comprises a fixing wall portion 42a which is formed at its outer portion with two bolt holes 42b formed therethrough, a guiding wall portion 42c which extends from an inner end of the fixing wall portion 42a toward the lid member 20, and a holding portion 42d for detachably holding the cylindrical projection 20i of the first bracket member 20d. The holding portion 42d comprises a base portion 42e secured to the fixing wall portion 42a, and two opposed resilient portions 42f for interposing the cylindrical projection 20i therebetween. There is provided a clearance 42g between rear ends of the opposed resilient portions 42f so as to allow the rectangular base portion 20h of the first bracket member 20d to be fitted therein. There is provided a space 42h between major curved portions of the opposed resilient portions 42f so as to allow the cylindrical projection 20i to be disposed therein. By the provision of the opposed portions 42f, the first bracket member 20d is allowed to be detached from the second bracket member 42 in a snap action manner when the air bag 28 is inflated and presses against the lid member 20.

Fixation of the lid member 20 on the instrument panel 12 will be described in the following.

Figure 4:
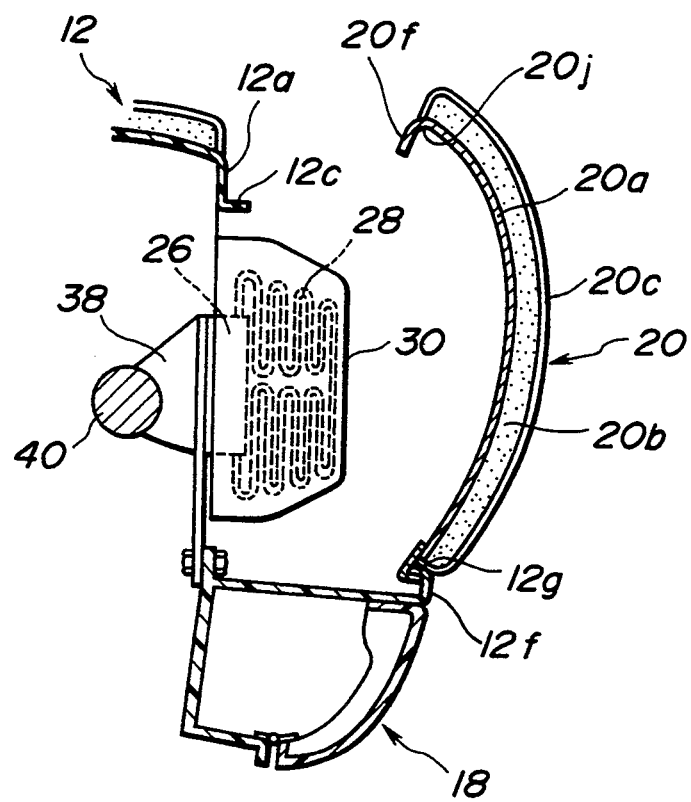
FIG. 4 is a view similar to FIG. 3, but showing the lid member which is in the middle of a fixing process of the same on the instrument panel.

First, as is seen from FIG. 4, the lid member 20 is brought into engagement at its hooks 20e with the horizontal portion 12g of the lower flange 12f of the instrument panel 12. Then, the lid member 20 is brought into abutment at its upper flange 20f with the upper flange 12a of the instrument panel 12.

With this, as is seen from FIG. 3, the bolt holes 12b of the upper flange 12a of the instrument panel 12 are respectively in alignment with the bolt holes 20g of the upper flange 20f of the lid member 20, and a lower end of the upper flange 20f of the lid member 20 is in abutment with the horizontal supporting portion 12c of the upper flange 12a of the instrument panel 12, thereby supporting the upper flange 20f thereon. Under this condition, a plurality of bolts 46 are passed through the bolt holes 12b and 20g and threadedly engaged with nuts 48 so as to fix the lid member 20 to the instrument panel 12. With this, the cylindrical projection 20i of each first bracket member 20d is positioned near and spaced from the side flange 12d of the instrument panel 12 so as to have a predetermined clearance therebetween. Then, each second bracket member 42 is slid laterally outward along a surface of the side flange of the instrument panel, which surface faces a passenger space, until the second bracket member 42 assumes a position wherein the cylindrical projection 20i of the first bracket member 20d is received in the space 42h defined by the opposed resilient portions 42f of the second bracket member 42. With this, the bolt holes 12e of the side flange 12d are in alignment with the bolt holes 42b of the second bracket member 42. Then, bolts 44 are passed through the bolt holes 12e and 42b, and threadedly engaged with nuts (not shown). With this, the second bracket member 42 is secured to the side flange 12d so as to detachably connect the lid member 20 to the instrument panel 12.

Operation of the air-bag device will be described in the following.

When deceleration of a motor vehicle in the event of a collision is over a predetermined level, an electrical signal is sent from the collision sensor 36 to the initiator. With this, the initiator is ignited to start the operation of the gas generator 26 so as to generate gas due to the combustion of the propellent pellets, followed by a sudden rush of gas into the air bag 28 and a rapid rate of inflation thereof. Upon the inflation of the air-bag the air-bag 28, presses the module cover. With this, as shown with arrows in FIG. 2, upper and lower portions of the module cover 30 are respectively opened upwardly and downwardly so as to allow the air bag 28 to be inflated in a controlled manner. Then, the air bag 28 continues to be inflated under the guidance of the guiding wall portion 42c of the second bracket member 42 so as to be inflated in a controlled manner. Then, the air bag 28 presses against the lid member 20. With this, the cylindrical portion 20i of the first bracket member 20d of the lid member 20 is detached from the opposed resilient portions 42f of the second bracket member 42 in a snap action manner. At almost the same time as the detachment of the first bracket member 20d, the hooks 20e of the lid member 20 are distorted to be disengaged from the lower flange 12f of the instrument panel 12. Since the lid member 20 is tightly fixed at its upper flange 20f to the upper flange 12a of the instrument panel 12, the lid member 20 is pivotally raised about an upper end portion 20j of the base plate 20a which is flexible so as to allow the air bag 28 to be inflated full in a controlled manner for protecting a front passenger.

Advantages of the first embodiment of the present invention will be described in the following.

It should be noted that the second bracket member 42 is brought into engagement with the first bracket member 20d of the lid member 20 in a manner wherein distortion of either of the first and second bracket members 20d and 42 is absent. Therefore, grip or resilience of the opposed portions 42f of the second bracket member 42 which directly effects the snap action characteristics of the same is maintained exactly at the value nominated by design specifications. Therefore, the lid member 20 is opened in an exactly controlled manner. If the second bracket member 42 were brought into engagement with the first bracket member 20d in a snap action manner, grip of the opposed portions 42f of the second bracket member 42 would tend to deviate from the value nominated by design specifications. With this, the lid member 20 would not open in the controlled manner.

Since the lid member 20 is directly fixed on the instrument panel 12, the lid member 20 does not tend to be displaced from a predetermined position relative to the instrument panel 12. This improves the external appearance of the instrument panel 12 and the lid member 20.

Referring to FIG. 6, there is shown a third bracket member 50 which has a cylindrical projection 50a in accordance with a second embodiment of the present invention.

Parts substantially the same as those of the above-mentioned first embodiment are denoted by the same numerals and a detailed explanation of them will be omitted from the following description.

Although not shown in FIG. 6, a fourth bracket member which is secured to a lower portion of the lid member 20 has opposed resilient portions. For detachably connecting the lid member 20 to the instrument panel 12, the third bracket members 50 are brought into engagement with the fourth bracket members in a manner wherein distortion of either of the third and fourth bracket members are absent. With this, when the air bag 28 is inflated and presses the lid member 20, the fourth brackets of the lid member 20 are detached from the third brackets 50 secured to the instrument panel 12 in a snap action manner.

Thus, it is understood that the second embodiment of the present invention has the same advantages as those of the first embodiment.

What is claimed is:

1. In a motor vehicle having a passenger space and an instrument panel, an air bag arrangement comprising:
   means for defining a recess in said instrument panel, said recess having an opening;
   an air bag module disposed in said recess, said air bag module including an air bag;
   a lid member for covering the opening of said recess, said lid member being secured to said instrument panel, said lid member being openable in response to inflation of said air bag to accommodate expansion of said air bag into said passenger space;
   a first bracket member secured to said lid member;
   a second bracket member arranged to be brought into engagement with said first bracket member in a manner wherein distortion of both of said first and second bracket members is absent and to allow said first bracket member to be detached from said second bracket member in a snap action manner upon inflation of said air bag; and
   means for securing said second bracket member to said instrument panel;
   wherein said first bracket member is formed with one of a cylindrical projection and opposed resilient portions, and said second bracket member is formed with the other of said cylindrical projection and said opposed resilient portions, said opposed resilient portions being spaced from each other so as to allow said cylindrical projection to be slid into engagement with said opposed resilient portions in a manner wherein distortion of said opposed resilient portions and said cylindrical projection is absent and as to allow said first bracket member to be detached from said second bracket member in snap action manner upon inflation of said air bag.

2. An air-bag arrangement as claimed in claim 1, in which said first bracket member is spaced from a side vertical flange formed on said instrument panel so as to allow said second bracket member to be slid along a surface of said side vertical flange until said second bracket member assumes a position wherein said second bracket member is in engagement with said first bracket member, said second bracket member then being secured to said side vertical flange.

3. An air-bag arrangement as claimed in claim 1, in which said second bracket member has a flat wall portion for guiding inflation of said air bag into said passenger space, said flat wall portion extending toward said lid member.

4. An air-bag arrangement as claimed in claim 1, wherein said second bracket is secured to said instrument panel by a bolt.

5. A method for arranging an air bag device in a motor vehicle having a passenger space and an instrument panel, said panel having a recess for receiving therein an air bag module having an air bag, said recess having an opening, said method comprising the steps of:
   (a) securing a lid member to said instrument panel so as to cover said opening and as to be openable in response to inflation of said air bag to accommodate expansion of said air bag into said passenger space, said lid member having a first bracket member secured thereto;
   (b) before or after step (a), engaging a second bracket member with said first bracket member in a sliding manner wherein distortion of both of said first and second bracket members is absent; and
   (c) securing said second bracket member to said instrument panel so as to allow said first bracket member to be detached from said second bracket member in a snap action manner upon inflation of said air bag.

6. A method for arranging an air bag device in a motor vehicle having a passenger space and an instrument panel, said panel having a recess for receiving therein an air bag module having an air bag, said method comprising the steps of:

securing a lid member to said instrument panel so as to cover said recess and to be openable in response to inflation of said air bag to accommodate expansion of said air bag into said passenger space;

assembling a bracket, comprised of first and second bracket members which can be pulled apart by the application of a predetermined force, in a sliding manner wherein distortion of both of first and second bracket members is absent; and detachably connecting the lid member to said instrument panel using the assembled bracket.

7. An air-bag arrangement comprising:

means for defining a recess in an instrument panel;

an air-bag module disposed in said recess, said air-bag module including an air bag;

a lid member for covering said recess, said lid member being secured to said instrument panel, said lid member being openable in response to inflation of said air bag to accommodate expansion of said air bag; and snap action bracket means for detachably connecting said lid member to said instrument panel, said snap action bracket means including a first bracket member secured to one of said lid member and said instrument panel; and a second bracket member secured to the other of said lid member and said instrument panel, said first bracket member having a resilient portion which can grip a predetermined portion of the second bracket member and prevent the first and second bracket members from separating from one another until a predetermined force which pulls the same, is applied, said first and second bracket members being assembled together so that said resilient portion remains undistorted until the predetermined force is applied thereto;

wherein said predetermined portion of said second bracket member comprises a cylindrical projection, said resilient portion of said first bracket member comprises two opposed resilient members which are spaced from each other so as to allow said cylindrical projection to be received therebetween in a sliding manner such that distortion of either said opposed resilient members and said cylindrical portion is absent, and said opposed resilient members prevent the first and second bracket members from separating from one another until said predetermined force which pulls the same apart, is applied.

8. An air-bag arrangement as claimed in claim 7, in which said instrument panel and said lid member have first and second flanges respectively which are mated with each other so as to secure said lid member to said instrument panel.

9. An air-bag arrangement as claimed in claim 8, in which said second flange is formed on an upper end portion of said lid member.

10. An air-bag arrangement as claimed in claim 9, in which said second flange has a flexible portion which causes said lid member to pivot upwardly when the air bag is inflated.

11. An air-bag arrangement as claimed in claim 7, further comprising connecting means for detachably connecting said lid member to said instrument panel.

12. An air bag arrangement as claimed in claim 7, further comprising connecting means for detachably connecting said lid member to said instrument panel;

wherein said connecting means comprises a hook and a lower flange which are formed on a lower end of said lid member and on said instrument panel, respectively, and which detachably engage with each other.

13. An air bag for a motor vehicle having a passenger space and an instrument panel having a recess, the air bag comprising:

an air bag module disposed in said recess and including:

a lid member which covers the recess, said lid member being openable in response to inflation of said air bag to accommodate expansion of said air bag into the passenger space, a first bracket member secured to said lid member, and a second bracket member non-resiliently detachably engaged with said first bracket member such that at times when said first and second bracket members are engaged, to retain said lid member in place relative to said instrument panel, neither of said first and second bracket members experience distortion, and at times when said first and second bracket members become disengaged from each other during inflation of said air bag, said disengagement occurs in a snap action manner;

wherein said first bracket member is formed with one of a cylindrical projection and opposed resilient portions, and said second bracket member is formed with the other of said cylindrical projection and said opposed resilient portions, said opposed resilient portions being spaced from each other so as to allow said cylindrical projection to be slid into engagement with said opposed resilient portions in a manner wherein distortion of said opposed resilient portions and said cylindrical projection is absent and as to allow said first bracket member to be detached from said second bracket member in a snap action manner upon inflation of said air bag.

14. In a motor vehicle having a passenger space and an instrument panel, an air bag arrangement comprising:

means for defining a recess in said instrument panel, said recess having an opening;

an air bag module disposed in said recess, said air bag module including an air bag;

a lid member for covering the opening of said recess, said lid member being secured to said instrument panel, said lid member being openable in response to inflation of said air bag to accommodate expansion of said air bag into said passenger space;

a first bracket member secured to one of said lid member and said instrument panel;

a second bracket member secured to the other of said lid member and said instrument panel;

wherein said first bracket member includes means for receiving from a first direction said second bracket member therein such that said second bracket member is retained within said first bracket member relative to movement of one of said first and second bracket members in a second direction and means for allowing, upon inflation of said air bag, said one of said first and second bracket members to be released in said second direction so that said second bracket member is not retained in said first bracket member and wherein said first and second directions are approximately perpendicular to each other.

15. A method for arranging and releasing an air bag device in a motor vehicle having a passenger space and an instrument panel, said panel having a recess for receiving therein an air bag module including an air bag, said method comprising the steps of:

a) securing a lid member to said instrument panel so as to cover said recess and to be openable in response to inflation of said air bag;

b) retaining a first bracket member within a second bracket member relative to a first direction by moving one of the first and second bracket members in a second direction which is approximately perpendicular to the first direction so that the first and second bracket members are engaged;

c) fixing the first bracket member to one of the lid member and the instrument panel and the second bracket member to the other of the lid member and the instrument panel; and d) applying a force to move the one of the first and second bracket members which is affixed to the lid member in the first direction so that the first bracket member is not retained in the second bracket member.

16. A method as recited in claim 15, wherein during step d) the force is applied by inflating the air bag against the lid member.

* * * * *